United States Patent
Lee et al.

(10) Patent No.: US 12,015,163 B2
(45) Date of Patent: Jun. 18, 2024

(54) ECO-FRIENDLY POWER SOURCE SUCH AS BATTERY MODULE FOR A TRANSPORTATION VEHICLE AND METHOD OF MANUFACTURING BATTERY MODULE

(71) Applicant: SK On Co., Ltd., Seoul (KR)

(72) Inventors: Gang U Lee, Daejeon (KR); Ho Yeon Kim, Daejeon (KR); Sang Tae An, Daejeon (KR); Hwa Kyoo Yoon, Daejeon (KR); Jeong Woo Han, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/184,421

(22) Filed: Mar. 15, 2023

(65) Prior Publication Data

US 2024/0128562 A1    Apr. 18, 2024

(30) Foreign Application Priority Data

Oct. 13, 2022 (KR) .................. 10-2022-0131738
Oct. 28, 2022 (KR) .................. 10-2022-0141740

(51) Int. Cl.
*H01M 50/20* (2021.01)
*H01M 10/48* (2006.01)
(Continued)

(52) U.S. Cl.
CPC ......... *H01M 50/204* (2021.01); *H01M 10/48* (2013.01); *H01M 50/507* (2021.01); *H01M 2220/20* (2013.01)

(58) Field of Classification Search
CPC .... H01M 50/20; H01M 50/204; H01M 50/50; H01M 50/507; H01M 10/48; H01M 10/0525
See application file for complete search history.

(56) References Cited

U.S. PATENT DOCUMENTS

2011/0258845 A1* 10/2011 Wells ............... H01M 10/6556
                                                        29/623.1
2012/0115011 A1*  5/2012 Kim .................... H01M 10/613
                                                        429/156
(Continued)

FOREIGN PATENT DOCUMENTS

EP          2575195 A1    4/2013
EP          4016703 A1    6/2022
(Continued)

OTHER PUBLICATIONS

Office Action for the Korean Patent Application No. 10-2022-0141740 issued by the Korean Intellectual Property Office dated Sep. 5, 2023.

(Continued)

*Primary Examiner* — Kenneth J Douyette
(74) *Attorney, Agent, or Firm* — IP&T GROUP LLP (57) ABSTRACT

An eco-friendly power source, such as a battery module provided for a transportation vehicle includes a first sub-module and a second sub-module disposed in a first direction, the first sub-module and the second sub-module respectively including a plurality of battery cells stacked in a second direction, which is perpendicular to the first direction, and a lower cover coupled to the first sub-module and the second sub-module. The first sub-module and the second sub-module are disposed to be rotationally symmetrical to each other about a central axis, which is perpendicular to both the first direction and the second direction.

14 Claims, 7 Drawing Sheets

(51) Int. Cl.
*H01M 50/204* (2021.01)
*H01M 50/507* (2021.01)

(56) References Cited

U.S. PATENT DOCUMENTS

| | | |
|---|---|---|
| 2016/0133890 A1 | 5/2016 | Lee et al. |
| 2016/0134000 A1 | 5/2016 | Lee et al. |
| 2019/0372069 A1* | 12/2019 | Lee .................... H01M 50/262 |
| 2020/0259155 A1 | 8/2020 | Lee et al. |
| 2021/0336287 A1 | 10/2021 | Kim et al. |
| 2022/0320624 A1 | 10/2022 | Kuramitsu |

FOREIGN PATENT DOCUMENTS

| | | |
|---|---|---|
| EP | 4016712 A1 | 6/2022 |
| KR | 20120005728 A | 1/2012 |
| KR | 20150015136 A | 2/2015 |
| KR | 20150015169 A | 2/2015 |
| KR | 20190072093 A | 6/2019 |
| KR | 10-2020-0086170 A | 7/2020 |
| KR | 20210099259 A | 8/2021 |
| KR | 10-2022-0051709 A | 4/2022 |

OTHER PUBLICATIONS

Notice of Allowance for the Korean Patent Application No. 10-2022-0141740 issued by the Korean Intellectual Property Office on Jan. 14, 2024.
Extended European Search Report for the European Patent Application No. 23163371.0 issued by the European Patent Office on Feb. 22, 2024.

* cited by examiner

ECO-FRIENDLY POWER SOURCE SUCH AS BATTERY MODULE FOR A TRANSPORTATION VEHICLE AND METHOD OF MANUFACTURING BATTERY MODULE

CROSS-REFERENCE TO RELATED APPLICATION(S)

This application claims benefit of priority to Korean Patent Application No. 10-2022-0131738 filed on Oct. 13, 2022 and Korean Patent Application No. 10-2022-0141740 filed on Oct. 28, 2022 in the Korean Intellectual Property Office, the disclosure of which is incorporated herein by reference in its entirety.

BACKGROUND

1. Field

Embodiments of the present disclosure relate to a battery module and a method of manufacturing the same.

2. Description of Related Art

Secondary batteries, unlike primary batteries, are convenient in that they can be charged and discharged, and have thus drawn significant attention as power sources for various mobile devices and electric vehicles. For example, a battery module may be formed by connecting a plurality of secondary batteries (battery cells) using a non-aqueous electrolyte having high energy density, and the battery module may be used as a power source of an electric vehicle.

In order to form a high-capacitance and large-area battery module, the number of required battery cells may increase. As the number of battery cells increases, an assembly structure of the battery module may become complicated and time required for assembly may increase.

Accordingly, there is a growing need for simplifying a structure of the battery module to improve assembly efficiency and for reducing a weight of the battery module.

SUMMARY

A battery module including multiple sub-modules has been developed and applied as an eco-friendly power source for an electric automobile such as a hybrid vehicle. One aspect of the present disclosure provides a battery module having a simple structure and improved assemblability and a method of manufacturing the same.

Another aspect of the present disclosure provides a high-capacitance battery module by assembling a plurality of sub-modules together.

According to one aspect of the present disclosure, there is provided a battery module including a first sub-module and a second sub-module disposed in a first direction, the first sub-module and the second sub-module respectively including a plurality of battery cells stacked in a second direction, which is perpendicular to the first direction, and a lower cover coupled to the first sub-module and the second sub-module. The first sub-module and the second sub-module may be disposed to be rotationally symmetrical to each other about a central axis, which is perpendicular to both the first direction and the second direction.

The first sub-module and the second sub-module may have the same structure.

The first sub-module and the second sub-module may respectively include a cell stack including a plurality of battery cells stacked in the second direction, perpendicular to the first direction, an end cover disposed to be adjacent to an edge of the lower cover, a center cover disposed to be spaced apart from the end cover in the first direction, and a plurality of side covers respectively coupled to the end cover and the center cover.

The battery module may further include an upper cover disposed above the first sub-module and the second sub-module. In at least one of the upper cover and the lower cover, a portion facing the first sub-module and a portion facing the second sub-module are integrally formed with each other.

The first sub-module and the second sub-module may further include a first sub-sensing module and a second sub-sensing module configured to sense states of the plurality of battery cells, respectively. The first sub-sensing module and the second sub-sensing module may be arranged in the first direction.

The first sub-sensing module and the second sub-sensing module may be disposed to be closer to the center cover than to the end cover.

The upper cover may include an opening through which the first sub-sensing module and the second sub-sensing module are exposable.

The cell stack may face the upper cover or the lower cover in a state in which upper portions or lower portions of the plurality of battery cells are exposed.

The center cover may be coupled to at least one of the upper cover or the lower cover.

The battery module may further include a fastening member passing through the upper cover or the lower cover, the fastening member fastened to the center cover or the end cover.

At least one of the upper cover or the lower cover may be coupled to the plurality of side covers.

The side cover of the first sub-module and the side cover of the second sub-module may be coupled to each other while facing each other in the first direction.

The center cover of the first sub-module and the center cover of the second sub-module may be in contact with each other in the first direction.

The center cover of the first sub-module may include an insertion protrusion inserted into the center cover of the second sub-module. The center cover of the second sub-module may include an insertion groove into which the insertion protrusion of the first sub-module is inserted.

The first sub-module and the second sub-module respectively may further include a busbar assembly configured to electrically connect the plurality of battery cells to each other. The busbar assembly may include a first busbar assembly disposed between the cell stack and the end cover of a corresponding sub-module; and a second busbar assembly disposed between the cell stack and the center cover of the corresponding sub-module. The first busbar assembly may include a pair of terminal portions electrically connected to the plurality of battery cells.

The first sub-module and the second sub-module respectively may further include a plurality of insulating covers respectively disposed between the busbar assembly and the end cover of a corresponding sub-module and between the busbar assembly and the center cover of the corresponding sub-module.

According to another aspect of the present disclosure, there is provided a method of manufacturing a battery module, the method including a sub-module manufacturing operation of manufacturing a first sub-module and a second sub-module respectively including a plurality of battery cells, an arrangement operation of arranging the first sub-module and the second sub-module in a first direction, and a casing operation of coupling an upper cover or a lower cover to the first sub-module and the second sub-module. In the arrangement operation, the first sub-module and the second sub-module may be arranged to be rotationally symmetrical to each other about a central axis, perpendicular to the first direction.

The first sub-module and the second sub-module may respectively include a cell stack including the plurality of battery cells stacked in a second direction, perpendicular to the first direction, an end cover disposed to be adjacent to an edge of the upper cover or the lower cover, a center cover disposed to be spaced apart from the end cover in the first direction, and a plurality of side covers respectively coupled to the end cover and the center cover.

In the casing operation, the center cover of the first sub-module and the center cover of the second sub-module may be in contact with each other in the first direction.

The first sub-module and the second sub-module may further include a first sub-sensing module and a second sub-sensing module configured to sense states of the plurality of battery cells, respectively. The first sub-sensing module and the second sub-sensing module may be arranged in the first direction.

According to another aspect of the present disclosure, there is provided a battery module including a first sub-module and a second sub-module disposed in a first direction, the first sub-module and the second sub-module respectively including a plurality of battery cells stacked in a second direction, perpendicular to the first direction; and a lower cover coupled to the first sub-module and the second sub-module. The lower cover is rotationally symmetrical about a central axis, perpendicular to both the first direction and the second direction, and the lower cover comprises at least two refrigerant ports disposed at opposite ends of the battery module through which refrigerant flows to absorb thermal energy from the first sub-module and the second sub-module.

A battery module according to various embodiments may have a simple structure and improved assemblability.

In addition, according to various embodiments, a high-capacitance battery module may be implemented by rapidly assembling a plurality of sub-modules.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, various embodiments of the present disclosure will be described in detail with reference to the accompanying drawings. Before describing the embodiments, certain words and terminologies used in the specification and claims may be construed with common or dictionary meanings, while other words may be construed with a meaning and conception coinciding with the aspects of the invention being described under a principle that the inventor(s) can appropriately define terminologies to explain the invention. Therefore, embodiments described in the specification and the configurations illustrated in the drawings describe more than the most preferred embodiments of the present disclosure and do not necessarily cover the full scope of the present disclosure. Accordingly, it should be understood that there may be various equivalents and modifications recognized by those skilled in the art that are included with those disclosed in the filed application.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

As used herein, an upper side, an upper portion, a lower side, a lower portion, and the like are described with reference to the drawings, and may be described differently when the direction of a corresponding object is changed.

In addition, as used herein, terms including an ordinal number such as "first" and "second" may be used to distinguish between components. The ordinal number is used to distinguish the same or similar components from each other, and the meaning of the term should not be limitedly interpreted due to the use of the ordinal number. For example, components combined with the ordinal number should not be construed as limiting the order of use or arrangement by the number. If necessary, respective ordinal numbers may be used interchangeably.

Hereinafter, various embodiments of the present disclosure will be described in detail with reference to the accompanied drawings. However, the present disclosure is not limited to the presented embodiments. For example, a person skilled in the art, and understanding the present disclosure, would recognize other embodiments included within the scope of the present disclosure through the addition, change, or deletion of components. All such variations are also within the scope of the present disclosure. The shapes and sizes of the elements in the drawings may be exaggerated for clarity of description, and the elements denoted by the same reference numerals in the drawings may be the same elements.

First, a structure of a battery module will be described with reference to FIGS. 1 to 5.

Figure 1:
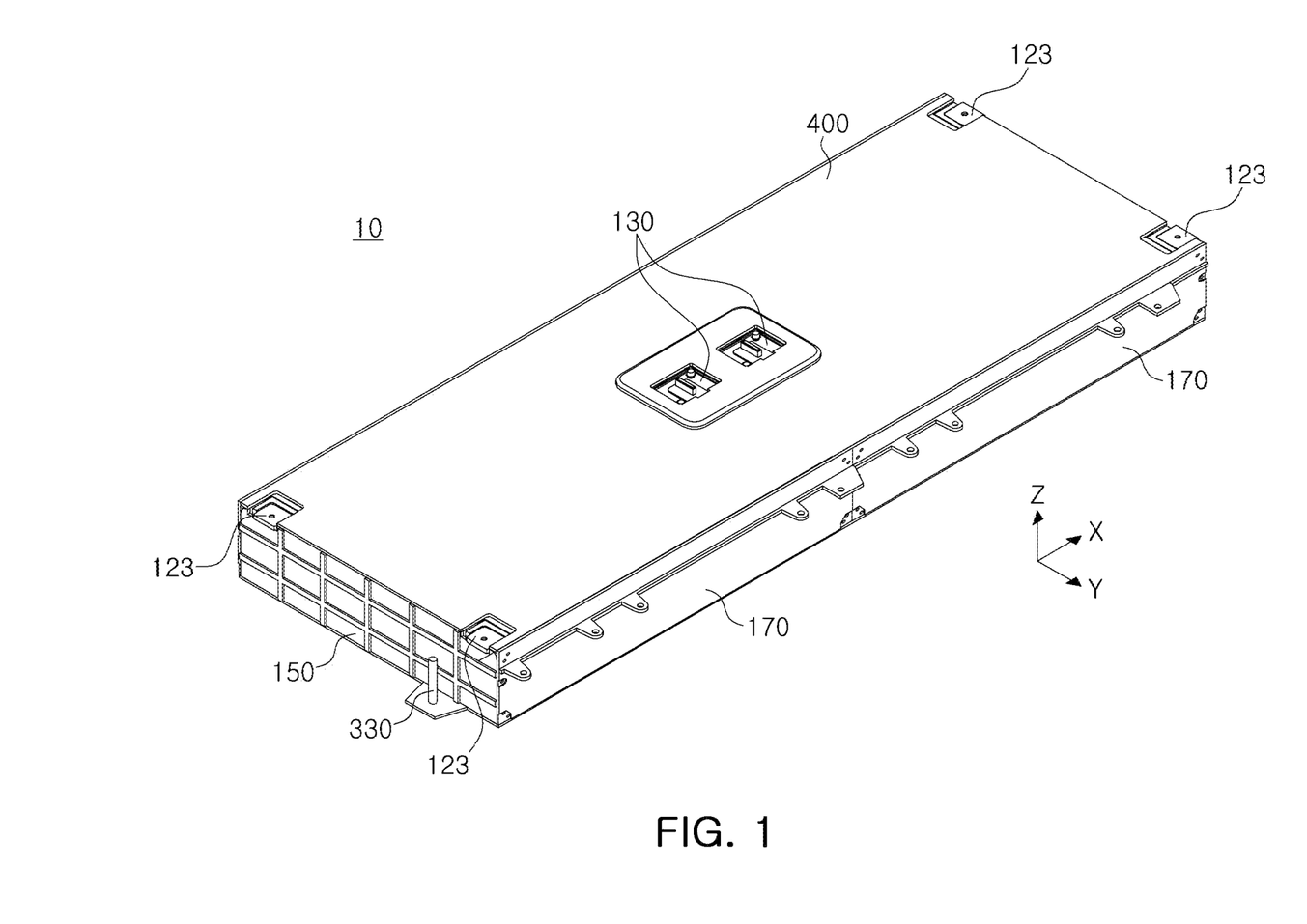
FIG. 1 is a perspective view of a battery module in accordance with one embodiment of the present disclosure.
Figure 2:
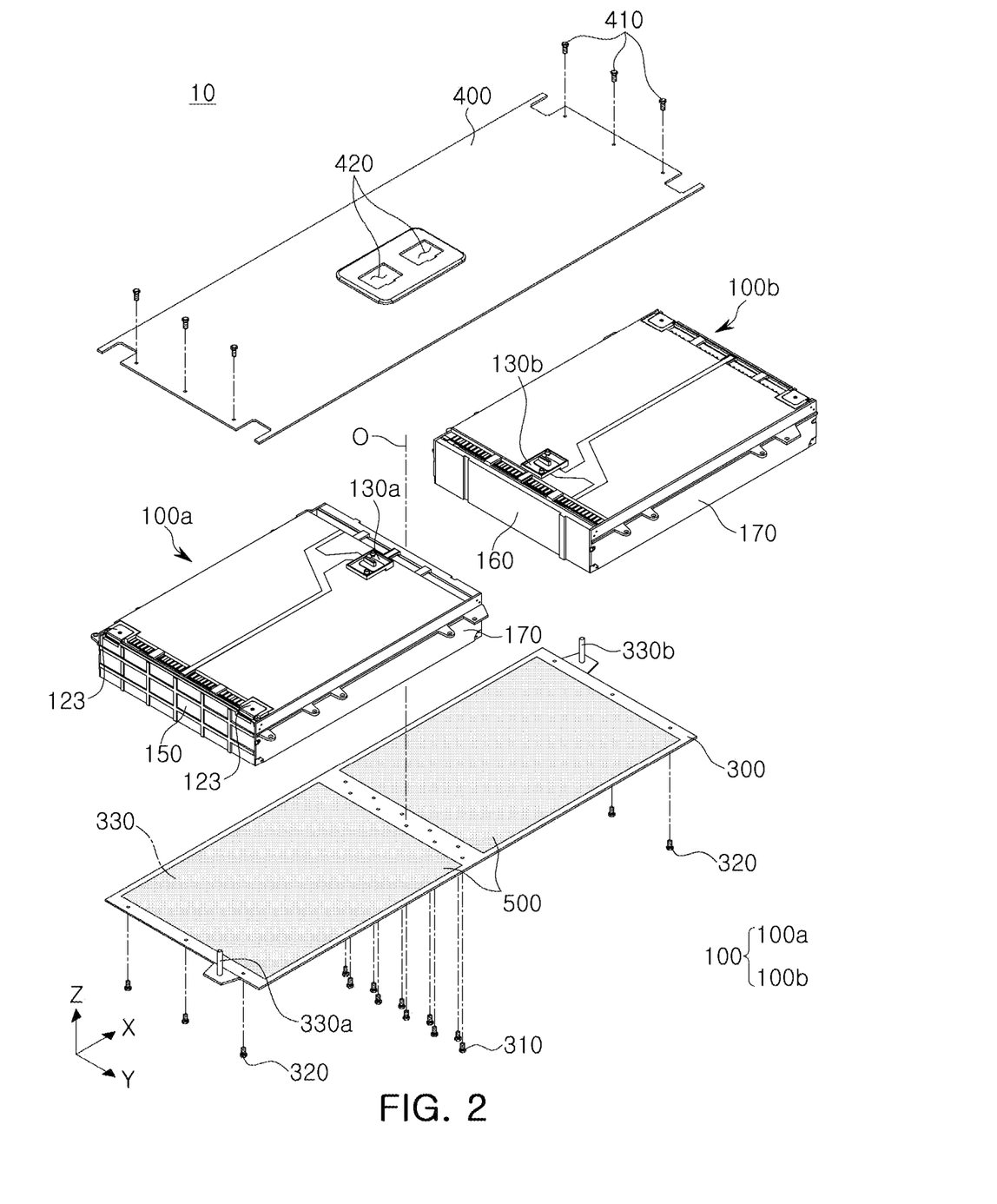
FIG. 2 is an exploded perspective view of the battery module of FIG. 1.
Figure 3:
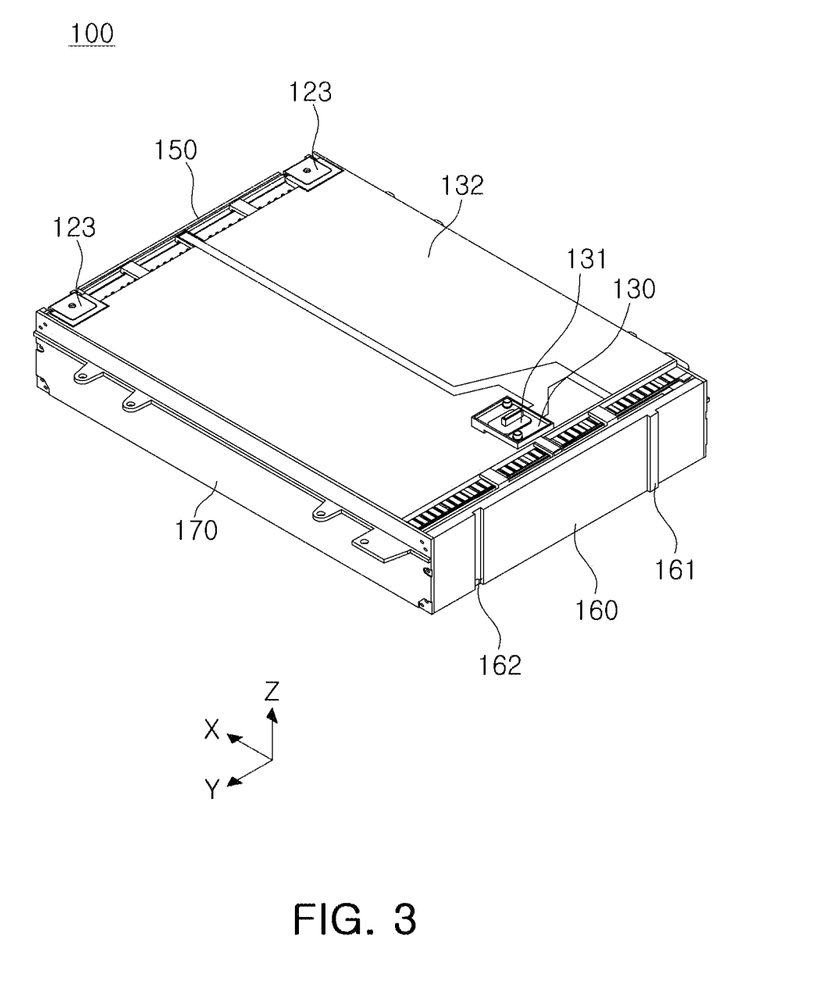
FIG. 3 is a perspective view of a sub-module in accordance with another embodiment of the present disclosure.
Figure 4:
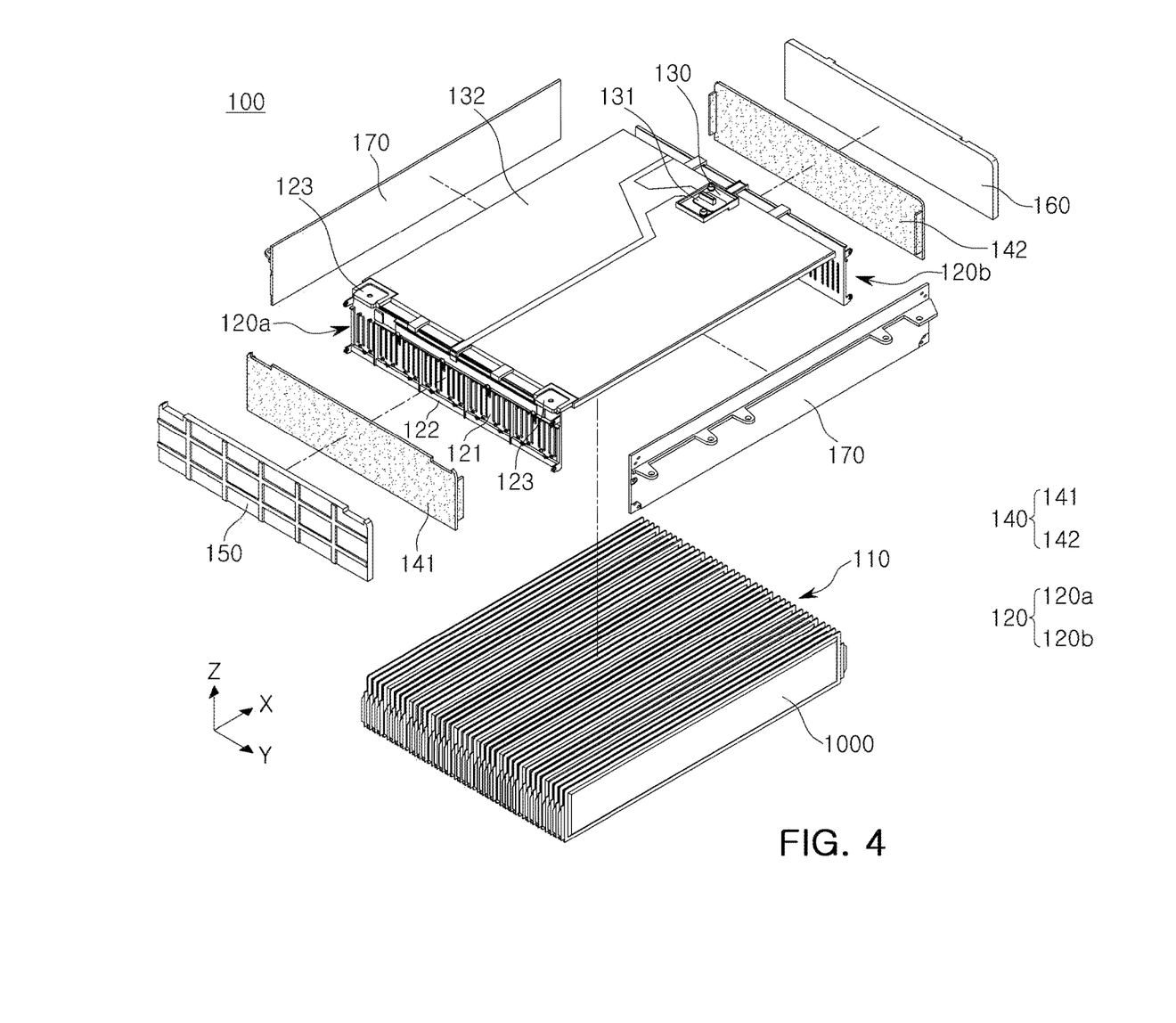
FIG. 4 is an exploded perspective view of the sub-module of FIG. 3.
Figure 5:
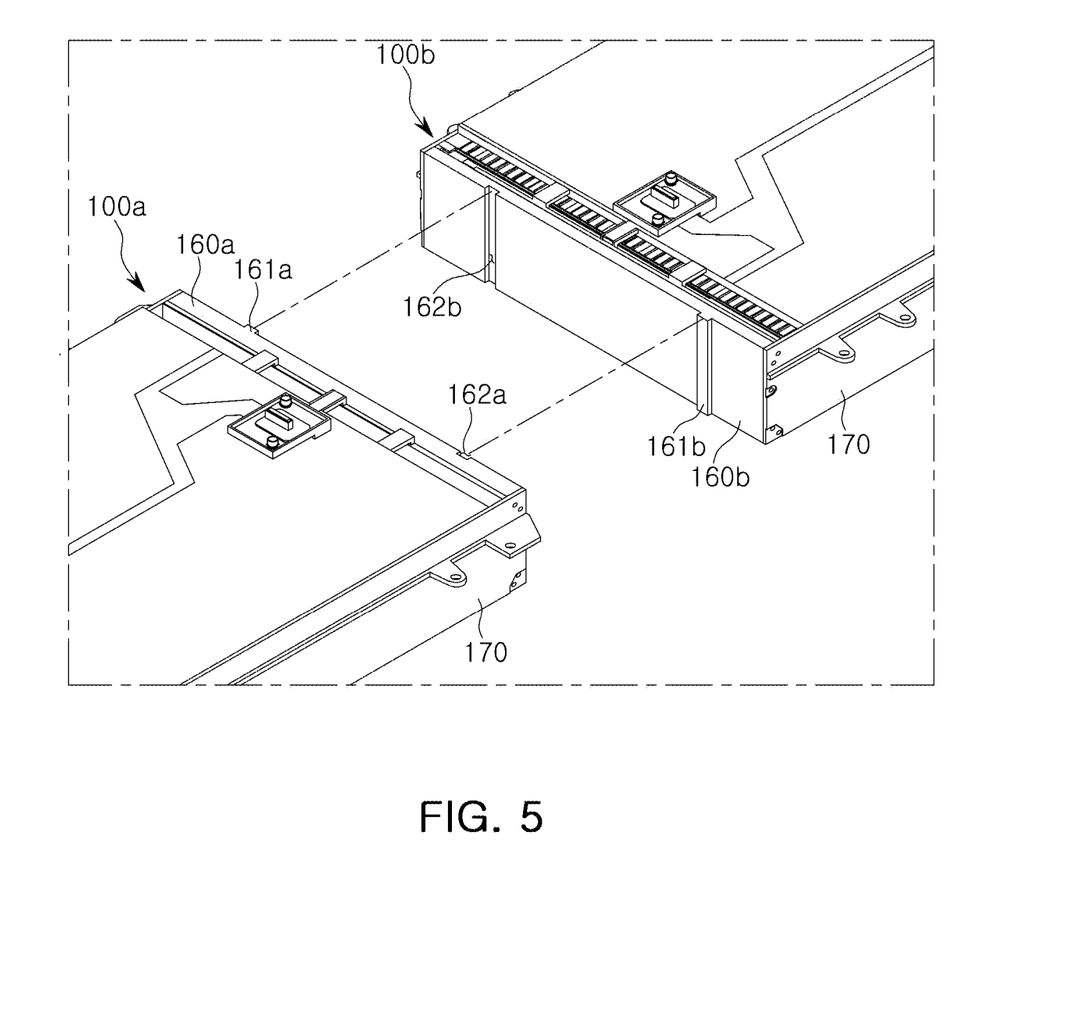
FIG. 5 is an exemplary diagram illustrating assembly of a plurality of sub-modules in accordance with still another embodiment of the present disclosure.

FIG. 1 is a perspective view of a battery module 10. FIG. 2 is an exploded perspective view of the battery module 10. FIG. 3 is a perspective view of a sub-module 100. FIG. 4 is an exploded perspective view of the sub-module 100. FIG. 5 is an exemplary diagram illustrating assembly of a plurality of sub-modules 100. FIGS. 1 to 5 illustrate structures and shapes of the sub-module 100 and the battery module 10, and specific shapes of components included in the sub-module 100 and the battery module 10 are illustrated in FIGS. 1 to 5, although the present disclosure is not limited to those specific shapes.

The battery module 10 may include a plurality of sub-modules 100. For example, referring to FIG. 2, a first sub-module 100a and a second sub-module 100b may be assembled together in a direction (for example, an X-axis direction) to form one battery module 10. In the following description, a direction, parallel to a direction in which the first sub-module 100a and the second sub-module 100b oppose each other, may be defined as a first direction.

The first sub-module 100a and the second sub-module 100b included in the battery module 10 may have the same structure. For example, the entire battery module 10 may be formed by manufacturing a plurality of sub-modules 100 of the same type, and then assembling the plurality of sub-modules 100 together.

That is, in the following description, the "first sub-module 100a" and the "second sub-module 100b" merely refer to one or the other of two sub-modules 100 assembled together, and both may be understood as sub-modules 100 having the same structure. In addition, the "sub-module 100'" may be understood to refer to one of the above-described "first sub-module 100a" and "second sub-module 100b."

The battery module 10 may include a lower cover 300 and an upper cover 400 supporting the plurality of sub-modules 100.

One lower cover 300 may be disposed to cover the lower surfaces of the plurality of sub-modules 100.

Alternatively, one upper cover 400 may be disposed to cover upper surfaces of the plurality of sub-modules 100. In one embodiment, in at least one of the upper cover 400 and the lower cover 300, a portion facing the first sub-module 100a and a portion facing the second sub-module 100b may be integrally formed with each other.

However, structures of the lower cover 300 and the upper cover 400 are not limited thereto. For example, a plurality of lower covers or a plurality of upper covers may be provided to cover the plurality of sub-modules 100, respectively, and the plurality of lower covers may be coupled to each other to form one structure 300.

A heat dissipation member 500 may be disposed between the lower cover 300 and the plurality of sub-modules 100 (as shown in FIG. 2. One surface of the heat dissipation member 500 may be disposed to be in contact with the sub-module 100 and the other surface opposite to the one surface may be in contact with the lower cover 300. The heat dissipation member 500 may be provided as a thermal adhesive.

A heat sink 330 may be disposed on the lower cover 300. A flow path through which a cooling medium flows may be formed in the heat sink 330. The heat sink 330 may include refrigerant ports 330a and 330b through which refrigerant flows in and out. For example, the refrigerant ports 330a and 330b may include a refrigerant inlet port 330a disposed on one side of one sub-module 100 (e.g., the first sub-module 100a) and a refrigerant outlet port 330b disposed on one side of the other sub-module 100 (e.g., the second sub-module 100b). The refrigerant introduced into the refrigerant inlet 330a may flow through lower portions of the plurality of sub-modules 100 while absorbing thermal energy of the sub-modules 100, and then may be discharged through the refrigerant outlet 330b.

The heat sink 330 may be integrally formed to cover all of the plurality of sub-modules 100.

However, a structure of the heat sink 330 is not limited thereto. For example, a plurality of heat sinks 330 may be provided and configured to respectively match each sub-module 100.

The sub-module 100 may include a cell stack 110 including the battery cells 1000 stacked in a direction and a plurality of protective covers 150, 160, and 170 for protecting the cell stack 110.

The cell stack 110 may include a plurality of battery cells 1000 stacked next to each other (as shown in FIG. 4). A direction in which the plurality of battery cells 1000 are stacked and a direction in which the sub-modules 100 are disposed may be perpendicular to each other. For example, the sub-modules 100 may be disposed on an upper surface of the lower cover 300 in a first direction (X-axis direction), and the battery cells 1000 included in each sub-module 100 may be stacked in a second direction (for example, Y-axis direction), different from the first direction (X-axis direction). For example, the second direction (Y-axis direction) may be a direction, perpendicular to the first direction (X-axis direction). In the following description, the "second direction" may be understood as being a direction in which the battery cells 1000 are stacked.

The plurality of battery cells 1000 included in the cell stack 110 may be pouch-type secondary batteries. The battery cell 1000 may be configured to convert chemical energy into electrical energy to supply power to an external circuit, or to receive power supplied from the outside and convert electrical energy into chemical energy to store electricity. For example, the battery cell 1000 may include a nickel metal hydride (Ni-MH) battery or a lithium ion (Li-ion) battery capable of being charged and discharged. In various embodiments, the plurality of battery cells 1000 may be connected to each other in series or in parallel while being stacked next to each other to form one cell stack 110.

The cell stack 110 may further include various types of protection members for protecting the battery cells 1000 in addition to the battery cells 1000. For example, the cell stack 110 may be formed by stacking the plurality of battery cells 1000 and a plurality of protection members (not illustrated).

The protection member may include a compression pad (not illustrated) or a heat insulating sheet (not illustrated), or a combination of the compression pad (not illustrated) and the heat insulating sheet (not illustrated).

The compression pad may protect the battery cell 1000 from external impact, or may absorb expansion pressure caused by expansion of the battery cell 1000. For example, the compression pad (not illustrated) may absorb the expansion pressure of the battery cell 1000 by including a polyurethane-based material.

The heat insulating sheet may be disposed to oppose at least one of the battery cell 1000 or the compression pad (not illustrated). The heat insulating sheet (not illustrated) may block flame or high-temperature thermal energy from propagating between neighboring battery cells 1000, thereby preventing chain ignition from occurring in the cell stack 110. For example, the heat insulating sheet (not illustrated) may include at least some materials of mica, silicate, graphite, alumina, ceramic wool, and aerogel capable of preventing heat and/or flame propagation.

A plurality of protection members may be disposed in the cell stack 110, and may be disposed between neighboring battery cells 1000 or disposed at an edge of the cell stack 110. However, a position of the protection member (not illustrated) is not limited thereto, and the protection member (not illustrated) may be appropriately disposed inside or outside of the sub-module 100, as necessary. In addition, the cell stack 110 may further include various types of protection members in addition to the above-described compression pad (not illustrated) or heat insulating sheet (not illustrated).

The protective covers 150, 160, and 170 may include an end cover 150 and a center cover 160 covering at least one side and the other side of the cell stack 110, and a plurality of side covers 170.

The end cover 150 and the center cover 160 may be spaced apart from each other in the first direction (X-axis direction), and the cell stack 110 may be disposed between the end cover 150 and the center cover 160. The end cover 150 may be disposed to be adjacent to a side of the sub-module 100 on which a terminal portion 123 is disposed, and the center cover 160 may be disposed to be adjacent to a side of the sub-module 100 on which a connection portion 131 of a sub-sensing module 130 is disposed.

The side cover 170 may be disposed to oppose a wider surface of the battery cell 1000 to protect a side surface of the cell stack 110.

The end cover 150, the center cover 160, and the side cover 170 may be formed of a material (for example, a metal material such as aluminum, SUS, or the like) having sufficient rigidity to protect the sub-module 100 from external impact.

The side cover 170 may be coupled to each of the end cover 150 and the center cover 160. For example, a fastening member (not illustrated) may pass through the side cover 170 to be fastened to the end cover 150 or the center cover 160. Alternatively, without a fastening member, the side cover 170 may be mutually bonded and fixed to the end cover 150 and the center cover 160. In this case, a bonding method by welding may be applied as a bonding method, but the present disclosure is not limited thereto.

The side cover 170 may also be coupled to a busbar frame 122 disposed inside the end cover 150 and the center cover 160.

The end cover 150, the center cover 160, and the side cover 170 may be firmly coupled to each other, such that the sub-module 100 may have structural stability.

The sub-module 100 may further include a busbar assembly 120 electrically connected to the cell stack 110, and an insulating cover 140 coupled to the busbar assembly 120.

The busbar assembly 120 may include a plurality of conductive members (busbars) 121 electrically connected to the battery cells 1000, and the busbar frame 122 supporting the busbars 121. Some of the plurality of busbars 121 may be connected to a terminal portion 123 connectable to an external electric circuit (as shown in FIG. 4). The terminal portion 123 may include a positive terminal and a negative terminal.

Referring to FIG. 4, the busbar assembly 120 may include a first busbar assembly 120a disposed on one side of the cell stack 110 and a second busbar assembly 120b disposed on the other side of the cell stack 110. A pair of terminal portions 123 may be disposed on one of the first busbar assembly 120a and the second busbar assembly 120b, and the terminal portions 123 may not be disposed on the other one. For example, the first busbar assembly 120a having the pair of terminal portions 123 may be disposed between the end cover 150, and the second busbar assembly 120b not having the terminal portions 123 may be disposed between the center cover 160 and the cell stack 110. The terminal portions 123 of the first busbar assembly 120a may be disposed to be adjacent to the end cover 150 to be exposed to the outside of the battery module 10. According such a structure, the terminal portions 123 may be spaced apart from each other in the second direction (Y-axis direction) along one edge of the sub-module 100.

A first insulating cover 141 may be disposed between the first busbar assembly 120a and the end cover 150, and a second insulating cover 142 may be disposed between the second busbar assembly 120b and the center cover 160. The first insulating cover 141 and the second insulating cover 142 may be coupled to the first busbar assembly 120a and the second busbar assembly 120b, respectively. The first insulating cover 141 and the second insulating cover 142 include an insulating material to prevent the end cover 150 and the center cover 160 from being electrically shorted to the busbar 121.

The sub-module 100 may include a sub-sensing module 130 capable of sensing states of the battery cells 1000 included in the cell stack 110. For example, the sub-sensing module 130 may be configured to sense an electrical state such as voltage, an amount of power, or the like or a thermal state such as temperature or the like of the battery cells 1000 and to transmit sensing data to the outside of the sub-module 100.

The sub-sensing module 130 may be connected to each of the first busbar assembly 120a and the second busbar assembly 120b to sense an electrical state or a thermal state.

The sub-sensing module 130 may include a connection portion 131 such that the sub-sensing module 130 is connected to other electric circuits outside of the sub-module 100 (for example, a sensing module of the battery module 10 or a sub-sensing module 130 of another sub-module 100). The connection portion 131 may be disposed on an upper surface of the sub-module 100.

The sub-module 100 may further include a support base 132 disposed on an upper portion of the cell stack 110, the support base 132 supporting the sub-sensing module 130. A lower surface of the support base 132 may oppose the cell stack 110, and the sub-sensing module 130 may be disposed on an upper surface of the support base 132.

The terminal portion 123 may be disposed to be adjacent to one edge of the sub-module 100, and the connection portion 131 of the sub-sensing module 130 may be disposed to be adjacent to the other edge of the sub-module 100. For example, the terminal portion 123 may be disposed on the first busbar assembly 120a disposed between the end cover 150 and the cell stack 110, and the connection portion 131 of the sub-sensing module 130 may be disposed to be closer to the center cover 160 than to the end cover 150. That is, the terminal portion 123 of the busbar assembly 120 and the connection portion 131 of the sub-sensing module 130 may be disposed on sides of one sub-module 100 opposite to each other.

The plurality of sub-modules 100 may be assembled together to form at least a portion of the battery module 10. For example, the first sub-module 100a and the second sub-module 100b may be arranged in the first direction (X-axis direction) to be assembled together.

In this case, the first sub-module 100a and the second sub-module 100b may be disposed to be symmetrical to each other. For example, as illustrated in FIG. 2, the first sub-module 100a and the second sub-module 100b may be arranged to be rotationally symmetrical to each other about a central axis O.

Here, rotational symmetry may refer to a symmetrical form in which one member overlaps another member when rotating about a central axis. That is, when the first sub-module 100a and the second sub-module 100b are rotationally symmetrical to each other about the central axis O, the first sub-module 100a may completely overlap the second sub-module 100b when rotating about the central axis O.

The central axis O may be an axis, perpendicular to both the first direction (X-axis direction) and the second direction (Y-axis direction). Alternatively, the central axis O may be an axis, perpendicular to the upper surface of the lower cover 300. A direction of the central axis O may be a height direction (for example, a Z-axis direction) of the battery module 10. In the following description, a direction, parallel to the central axis O, may be defined as a third direction (Z-axis direction).

The first sub-module 100a and the second sub-module 100b may be assembled such that the center covers 160 oppose each other.

The center cover 160 may have guide structures 161 and 162 guiding an assembly position of the sub-module 100. For example, an insertion protrusion 161 and an insertion groove 162 may be formed on a surface opposite to a surface of the center cover 160 oriented toward the cell stack 110 to guide relative positions of the two sub-modules 100. Referring to FIG. 5, the center cover 160a of the first sub-module 100a may have an insertion protrusion 161a and an insertion groove 162a, and the center cover 160b of the second sub-module 100b opposing the center cover 160a may have an insertion groove 162b into which the insertion projection 161a of the first sub-module 100a is inserted and an insertion projection 161b inserted into the insertion groove 162a of the first sub-module 100a. As described above, the insertion protrusions 161 and the insertion grooves 162 of the two center covers 160 may be engaged with each other, such that positions of the first sub-module 100a and the second sub-module 100b may be accurately aligned.

The first sub-module 100a and the second sub-module 100b may be assembled such that each terminal portion 123 is disposed at an edge of the battery module 10. For example, referring to FIGS. 1 and 2, the terminal portion 123 of the first sub-module 100a may be disposed along one edge of the battery module 10, and the terminal portion 123 of the second sub-module 100b may be disposed along the other edge opposite to the one edge of the battery module 10. In addition, the connection portion 131 of the sub-sensing module 130 of each sub-module 100 may be disposed next to each other in the first direction (X-axis direction) in a central region of the battery module 10. For example, referring to FIG. 2, the first sub-sensing module 130a of the first sub-module 100a and the second sub-sensing module 130b of the second sub-module 100b may be disposed next to each other in the first direction (X-axis direction) in a portion adjacent to the center cover 160. That is, the sub-sensing module 130 included in each sub-module 100 may be disposed on a central portion of the battery module 10, and the terminal portion 123 may be disposed outside of the battery module 10.

In a process in which the two sub-modules 100 are assembled, the side covers 170 included in each sub-module 100 may be bonded to each other. For example, the side cover 170 of the first sub-module 100a and the side cover 170 of the second sub-module 100b may oppose each other and may be bonded to each other in the first direction (X-axis direction). A bonding method by welding may be used for bonding between the side cover 170 of the first sub-module 100a and the side cover 170 of the second sub-module 100b, but the present disclosure is not limited thereto.

Upper and lower portions of the first sub-module 100a and the second sub-module 100b may be covered by the upper cover 400 and the lower cover 300, respectively.

The lower cover 300 may be coupled to the first sub-module 100a and the second sub-module 100b. For example, the fastening member 310 may pass through the lower cover 300 to be fastened to the center cover 160, and accordingly the first sub-module 100a and the second sub-module 100b may be fixed to the lower cover 300. In addition, another fastening member 320 may pass through the lower cover 300 to be fastened to the end cover 150.

The upper cover 400 may be coupled to the first sub-module 100a and the second sub-module 100b. For example, a fastening member may pass through the upper cover 400 to be fastened to the center cover 160, and accordingly the first sub-module 100a and the second sub-module 100b may be fixed to the upper cover 400. In addition, another fastening member 410 may pass through the upper cover 400 to be fastened to the end cover 150.

In a state in which the upper cover 400 and the lower cover 300 are coupled to the sub-modules 100, the end cover 150 of the sub-module 100 may be disposed to be adjacent to one edges of the upper cover 400 and the lower cover 300. In addition, the center cover 160 may be disposed in central regions in the first direction (X-axis direction) of the upper cover 400 and the lower cover 300.

The upper cover 400 may include an opening 420 through which the sub-sensing modules 130 of the plurality of sub-modules 100 are exposable. Even when the upper cover 400 covers upper portions of the plurality of sub-modules 100, the sub-sensing module 130 may be exposed in an upward direction (for example, a positive Z-axis direction) of the battery module 10 through the opening 420 to be connected to an external circuit.

The lower cover 300 and the upper cover 400 may be bonded to the side covers 170 of the sub-module 100, respectively. For example, in a state in which the sub-modules 100 are seated on the lower cover 300, the side cover 170 may be in contact with the lower cover 300, and may be bonded to each other along a portion in contact with the lower cover 300. Similarly, in a state in which the upper cover 400 is disposed on an upper portion of the sub-module 100, the side cover 170 may be in contact with the upper cover 400, and may be bonded to each other along a portion in contact with the upper cover 400.

As described above, the entire battery module 10 may be formed by coupling the upper cover 400 and the lower cover 300 to the sub-module 100.

In the battery module 10, the end cover 150 and the side cover 170 of each sub-module 100 may be exposed to the outside of the battery module 10. For example, the upper cover 400 may form an upper surface of the battery module 10, the lower cover 300 may form a lower surface of the battery module 10, and the end cover 150 and the side cover 170 may form side surfaces of the battery module 10. In this case, the center covers 160 of each sub-module 100 may oppose each other inside the battery module 10, and may be covered by the upper cover 400, the lower cover 300, and the side cover 170, such that the center cover 160 may not be exposed to the outside of the battery module 10.

Figure 6:
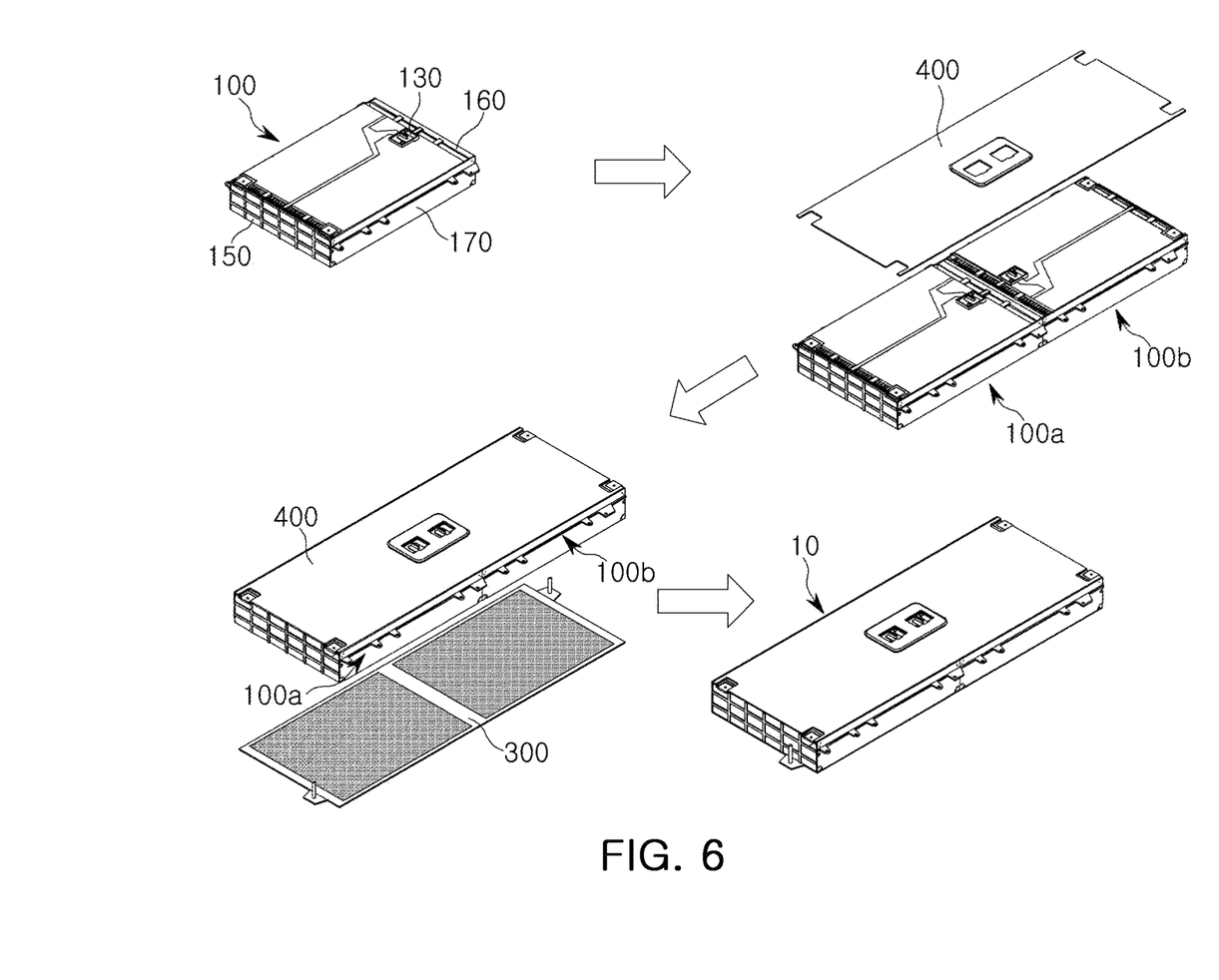
FIG. 6 illustrates an assembly sequence of a battery module in accordance with yet another embodiment of the present disclosure.

Hereinafter, a method of manufacturing the battery module 10 will be described with reference to FIG. 6. FIG. 6 illustrates an assembly sequence of the battery module 10. The sub-module 100 and the battery module 10 described with reference to FIG. 6 correspond to the sub-module 100 and battery module 10 described above with reference to FIGS. 1 to 5, and thus a repeated description may be omitted.

The method of manufacturing the battery module 10 may include a sub-module manufacturing operation of manufacturing a plurality of sub-modules 100, an arranging operation of arranging the manufactured sub-modules 100 with respect to each other, and a casing operation of coupling the upper cover 400 or the lower cover 300 to the sub-module 100.

In the sub-module manufacturing operation, the sub-modules 100 having the same structure may be repeatedly manufactured. For example, the first sub-module 100a and the second sub-module 100b having the same structure may be manufactured through the sub-module manufacturing operation. The entire battery module 10 may be formed by assembling the sub-modules 100 manufactured as described above.

In the arrangement operation, the sub-modules 100 may be arranged in appropriate positions. For example, in the arrangement operation, the first sub-module 100a and the second sub-module 100b may be arranged in the first direction (X-axis direction).

In the arrangement operation, the first sub-module 100a and the second sub-module 100b may be arranged to be rotationally symmetrical to each other about the central axis O. In this case, the central axis O may be an axis, perpendicular to both the first direction and the second direction.

In the arrangement operation, the center cover 160 of the first sub-module 100a and the center cover 160 of the second sub-module 100b may be arranged to be in contact with each other in the first direction (X-axis direction).

In the casing operation, the first sub-module 100a and the second sub-module 100b may couple the upper cover 400 and the lower cover 300 to each other in a state in which the center covers 160 thereof are in contact with each other. In this case, the above description provided in connection with FIGS. 1 to 5 may be referred to for a specific coupling structure.

The casing operation may further include a bonding operation of bonding the sub-modules 100 to each other, bonding the sub-module 100 and the upper cover 400 to each other, and bonding the sub-module 100 and the lower cover 300 to each other. Here, in the bonding operation, a bonding method by welding may be performed. However, the bonding method is not limited thereto. For example, in the bonding operation, the sub-module 100 and the lower cover 300 may be bonded through an adhesive material.

In addition, in each process, coupling or bonding between components may be performed through a fastening member (for example, a bolt) or through welding. However, a specific coupling method is not limited thereto.

The above-described sub-module manufacturing operation, arrangement operation, and casing operation are not necessarily performed in a sequence described above. That is, the sub-module manufacturing operation, the arrangement operation, and the casing operation may be performed sequentially or in a different sequence. Alternatively, two or more operations may be performed simultaneously.

As described above, the entire battery module 10 may be formed by combining sub-modules 100 of the same type with each other, thereby rapidly and efficiently manufacturing the battery module 10.

In addition, a high-capacitance battery module 10 may be implemented by combining a plurality of sub-modules 100 of the same type.

In addition, the sub-module 100 according to various embodiments may have a complete structure in which casing is completed by rigid covers (for example, the center cover 160, the side cover 170, and the end cover 150 may not be flexible), such that the sub-module 100 may be produced on a single line and may be handled in a manufacturing process.

In a battery module according to the related art, sub-components (for example, sub-modules) included in the battery module may have different structures, and thus respective sub-components may need to be individually manufactured. However, in the battery module 10 according to various embodiments, sub-modules 100 of the same type may be repeatedly manufactured and connected to each other to simply form the battery module 10, and thus there may be no need for process separation and component dualization.

Accordingly, the quickness and efficiency of manufacturing the battery module 10 may be increased, thereby implementing a structurally simple battery module 10.

Figure 7:
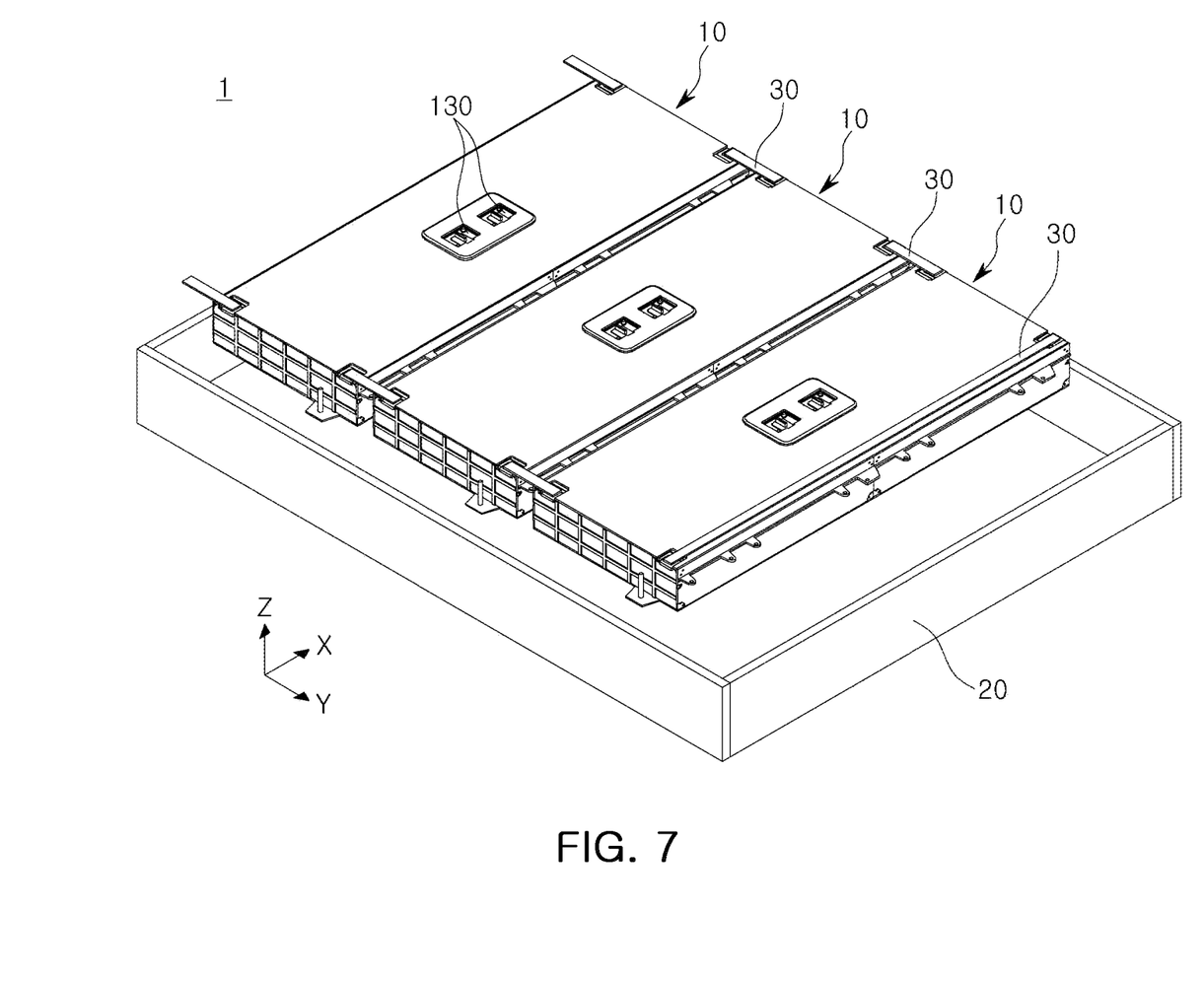
FIG. 7 illustrates a state in which a plurality of battery modules are electrically connected to each other in accordance with one embodiment of the present disclosure.

FIG. 7 illustrates a state in which a plurality of battery modules 10 are electrically connected to each other. The battery module 10 described with reference to FIG. 7 may correspond to the battery module 10 described above with reference to FIGS. 1 to 6, and thus a repeated description may be omitted.

A plurality of battery modules 10 may be connected to each other to form at least a portion of a battery pack 1. For example, FIG. 7 illustrates a state in which the battery modules 10 are electrically connected to each other and accommodated in a pack housing 20.

In one battery module 10, the plurality of sub-modules 100 may be electrically connected to each other to output a required design power value. For example, two sub-modules 100 opposing each other may be electrically connected to each other through the terminal portion 123.

Alternatively, in one battery module 10, the plurality of sub-modules 100 may be indirectly connected to each other through another battery module. For example, referring to FIG. 7, in one battery module 10, two sub-modules 100, opposing each other in a first direction (X-axis direction), may be electrically connected to other adjacent battery modules 10, respectively. That is, the terminal portion 123 of each sub-module 100 may be electrically connected to another neighboring battery module 10.

The battery module 10 may be formed by combining sub-modules 100 of the same type with each other. Accordingly, when the plurality of battery modules 10 are disposed in the battery pack 1, positions of the terminal units 123 may be regularly arranged, thereby connecting the plurality of battery modules 10 to each other For example, referring to FIG. 7, in each battery module 10, the terminal portion 123 may be disposed to be adjacent to an outer edge of the pack housing 20, and the connection portion 131 of the sensing module may be positioned in a central region of the pack housing 20. Accordingly, when a connection conductor 30 connects respective terminal portions 123 to each other, a high voltage HV connection line may be formed along edges of the battery modules 10. When the connection conductor 30 connects respective connection portions 131 to each other, a sensing line may be connected along a central region of the battery module 10.

As described above, the HV connection line may be formed to be adjacent to an outer line of the pack housing 20, and a maximum distance between the sensing line and the HV connection line may be maintained, thereby increasing electrical stability between the battery modules 10.

While various embodiments have been shown and described above, it will be apparent to those skilled in the art that modifications and variations could be made without departing from the scope of the present disclosure.

What is claimed is:

1. A battery module, comprising:
a first sub-module and a second sub-module disposed in a first direction, the first sub-module and the second sub-module respectively including a plurality of battery cells stacked in a second direction, which is perpendicular to the first direction;
a busbar bar assembly disposed on each of the first sub-module and the second sub-module and electrically connected to the plurality of battery cells, and including a first busbar assembly and a second busbar assembly facing each other with the plurality battery cells between in the first direction; and
a terminal portion provided in the first busbar assembly and electrically connected to the plurality of battery cells,
wherein the first sub-module and the second sub-module are disposed to be rotationally symmetrical to each other about a central axis, which is perpendicular to both the first direction and the second direction,
wherein the first busbar assembly is positioned farther from the central axis than the second busbar assembly, and
wherein the terminal portion is disposed closer to one side edge of each of the first sub-module and the second sub-module in the first direction than to the central axis.

2. The battery module of claim 1, further comprising:
a lower cover coupled to the first sub-module and the second sub-module;
wherein the first sub-module and the second sub-module respectively include:
a cell stack in which the plurality of battery cells are stacked;
an end cover disposed to be adjacent to an edge of the lower cover;
a center cover disposed to be spaced apart from the end cover in the first direction; and
a plurality of side covers respectively coupled to the end cover and the center cover.

3. The battery module of claim 2, further comprising:
an upper cover disposed above the first sub-module and the second sub-module,
wherein in at least one of the upper cover and the lower cover, a portion facing the first sub-module and a portion facing the second sub-module are integrally formed with each other.

4. The battery module of claim 3, wherein
the first sub-module and the second sub-module further include a first sub-sensing module and a second sub-sensing module configured to sense states of the plurality of battery cells, respectively, and
the first sub-sensing module and the second sub-sensing module are arranged in the first direction.

5. The battery module of claim 4, wherein the first sub-sensing module and the second sub-sensing module are disposed to be closer to the center cover than to the end cover.

6. The battery module of claim 4, wherein the upper cover includes an opening through which the first sub-sensing module and the second sub-sensing module are exposable.

7. The battery module of claim 3, wherein the cell stack faces the upper cover or the lower cover in a state in which upper portions or lower portions of the plurality of battery cells are exposed.

8. The battery module of claim 3, wherein the center cover is coupled to at least one of the upper cover or the lower cover.

9. The battery module of claim 8, further comprising:
a fastening member passing through the upper cover or the lower cover, the fastening member fastened to the center cover or the end cover.

10. The battery module of claim 3, wherein at least one of the upper cover or the lower cover is coupled to the plurality of side covers.

11. The battery module of claim 2, wherein the side cover of the first sub-module and the side cover of the second sub-module are coupled to each other while facing each other in the first direction.

12. The battery module of claim 2, wherein the center cover of the first sub-module and the center cover of the second sub-module are in contact with each other in the first direction.

13. The battery module of claim 12, wherein
the center cover of the first sub-module includes an insertion protrusion inserted into the center cover of the second sub-module, and
the center cover of the second sub-module includes an insertion groove into which the insertion protrusion of the first sub-module is inserted.

14. The battery module of claim 2, the first sub-module and the second sub-module respectively further include
a plurality of insulating covers respectively disposed between the busbar assembly and the end cover of a corresponding sub-module and between the busbar assembly and the center cover of the corresponding sub-module.

* * * * *